(12) United States Patent
Mikhtoniuk et al.

(10) Patent No.: US 11,275,726 B1
(45) Date of Patent: Mar. 15, 2022

(54) DISTRIBUTED DATA PROCESSING METHOD WITH COMPLETE PROVENANCE AND REPRODUCIBILITY

(71) Applicants: Sergii Mikhtoniuk, Burnaby (CA); Ozge Nilay Yalcin, Burnaby (CA)

(72) Inventors: Sergii Mikhtoniuk, Burnaby (CA); Ozge Nilay Yalcin, Burnaby (CA)

(73) Assignee: Kamu Data Inc., Vancouver (CA)

( * ) Notice: Subject to any disclaimer, the term of this patent is extended or adjusted under 35 U.S.C. 154(b) by 0 days.

(21) Appl. No.: 17/113,084

(22) Filed: Dec. 6, 2020

(51) Int. Cl.
*G06F 16/23* (2019.01)

(52) U.S. Cl.
CPC .............................. *G06F 16/2379* (2019.01)

(58) Field of Classification Search
CPC .................................................. G06F 16/2379
USPC ........................................................ 707/756
See application file for complete search history.

(56) References Cited

U.S. PATENT DOCUMENTS

| | | | | |
|---|---|---|---|---|
| 7,930,315 B2* | 4/2011 | Margolus | ............ | G06F 16/2358 707/781 |
| 7,979,397 B2* | 7/2011 | Margolus | ............ | G06F 16/2358 707/662 |
| 8,055,628 B2* | 11/2011 | Margolus | ............ | G06F 16/2358 707/663 |
| 8,788,830 B2* | 7/2014 | Piersol | ...................... | H04L 9/32 713/176 |
| 11,030,686 B2* | 6/2021 | Phillips | ................... | H04L 63/10 |
| 11,108,564 B2* | 8/2021 | Borne-Pons | .......... | H04L 9/3239 |
| 2006/0126842 A1* | 6/2006 | Campagna | ............ | H04L 9/0662 380/258 |
| 2010/0287382 A1* | 11/2010 | Gyorffy | .................. | G06F 21/36 713/185 |
| 2015/0280917 A1* | 10/2015 | Wolrich | .............. | G06F 12/0811 713/193 |
| 2019/0355057 A1* | 11/2019 | Phillips | ............... | G06F 21/6245 |
| 2020/0052879 A1* | 2/2020 | Gaur | ..................... | H04L 63/123 |

(Continued)

FOREIGN PATENT DOCUMENTS

CN 107193910 A * 9/2017

OTHER PUBLICATIONS

Tyler Akidau et.al. "The Dataflow Model: A Practical Approach to Balancing Correctness, Latency, and Cost in Massive-Scale, Unbounded, Out-of-Order Data Processing". In: Proceedings of the VLDB Endowment 8 (2015), pp. 1792-1803.

(Continued)

*Primary Examiner* — Sheree N Brown

(57) ABSTRACT

A system and method for distributed exchange and transformation of structured data with reproducibility and complete provenance are described. Data enters the system through the plurality of data publishers that share data in the form of append-only historical logs of events. Plurality of parties can then collaborate on improving and enriching data by defining the transformation rules, forming a potentially distributed computational graph. Data from any stage of such graph can be accessed by plurality of consumers. Stream processing techniques are used to minimize the propagation latency of data through the graph. Bitemporal data modelling and determinism of transformations enable reproducibility and verifiability of the results. Every event that influences how data looks like is tracked in the temporal metadata which enables provenance and dataset evolution.

9 Claims, 5 Drawing Sheets

(56) References Cited

U.S. PATENT DOCUMENTS

| | | | | |
|---|---|---|---|---|
| 2020/0184556 | A1* | 6/2020 | Cella | G06Q 10/0639 |
| 2020/0374300 | A1* | 11/2020 | Manevich | G06F 16/2255 |
| 2020/0374301 | A1* | 11/2020 | Manevich | H04L 63/1416 |
| 2021/0073913 | A1* | 3/2021 | Ingargiola | H04L 9/14 |
| 2021/0233192 | A1* | 7/2021 | Manamohan | G06Q 20/401 |
| 2021/0234668 | A1* | 7/2021 | Manamohan | H04L 9/008 |

OTHER PUBLICATIONS

Itamar Ankorion. "Change data capture efficient ETL for real-time bi". In: Information Management 15.1 (2005), p. 36.

Paris Carbone et. al. "Apache flink: Stream and batch processing in a single engine". In: Bulletin of the IEEE Computer Society Technical Committee on Data Engineering 36.4 (2015).

James Cheney, Laura Chiticariu and Wang-Chiew Tan. Provenance in databases: Why, how, and where. Now Publishers Inc, 2009.

Christopher John Date, Hugh Darwen and Nikos Lorentzos. Temporal data & the relational model. Elsevier, 2002.

Martin Fowler. Event Sourcing, url: https://martinfowler.com/eaaDev/EventSourcing.html. Accessed: Sep. 10, 2020. Published: Dec. 2005.

Google, Inc. Flatbuffers Project Documentation. url: https://google.github.io/flatbuffers/. Published: Jun. 2014.

Tom Johnston. Bitemporal Data: Theory and Practice. San Francisco: Elsevier Science & Technology, 2014. isbn: 0124080677.

Tobias Muller, Benjamin Dietrich and Torsten Grust. "You Say 'What', i Hear 'where' and 'Why': (Mis-) Interpreting SQL to Derive Fine-Grained Provenance". In: Proc. VLDB Endow. 11.11 (Jul. 2018), pp. 1536-1549. issn:2150-8097. doi: 10.14778/3236187.3236204. url: https://doi.org/10.14778/3236187.3236204.

Michael Noll. Streams and Tables in Apache Kafka: A Primer. url: https://www.confluent.io/blog/kafka-streams-tables-part-1-event-streaming. Accessed: Jan. 2020.

Kevin Petrie, Dan Potter and Itamar Ankorion. Streaming Change Data Capture. O'Reilly Media, Inc, 2018. isbn: 9781492032519.

Information Tech Laboratory National Institute of Standards and Technology. "SHA-3 standard: permutation-based hash and extendable-output functions". In: FIPS PUB 202 (Aug. 2015), pp. 1-37. url: https://csrc.nist.gov/publications/detail/fips/202/final.

Kostas Tzoumas. Batch is a special case of streaming. url: https://www.ververica.com/blog/batch-is-a-special-case-of-streaming. Published: Sep. 2015.

Matei Zaharia et al. "Apache spark: a unified engine for big data processing". In: Communications of the ACM 59.11 (2016), pp. 56-65.

Zibin Zheng et al. "An overview of blockchain technology: Architecture, consensus, and future trends". In: 2017 IEEE international congress on big data (BigData congress). IEEE. 2017, pp. 557-564.

\* cited by examiner

DISTRIBUTED DATA PROCESSING METHOD WITH COMPLETE PROVENANCE AND REPRODUCIBILITY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A COMPUTER PROGRAM LISTING COMPACT DISC

Not Applicable

FIELD OF THE INVENTION

The present invention relates to the field of structured data processing systems and methods, and more particularly to data pipelines, data sharing, temporal data modelling, stream processing, and the problems of reproducibility and provenance in data science workflows.

BACKGROUND OF THE INVENTION

The modern data space consists of an increasingly large amount of data publishers that collect and share data generated by the systems under their control (e.g. healthcare and financial data) or captured as a result of various observations (e.g. census, weather, and experiment data). Such raw data is rarely useful in its original form, so it undergoes a long series of transformations (filtering, re-shaping, aggregation, and enrichment) before some useful insights can be obtained from it, before it can be presented to decision-makers, used to train machine learning models, or used in process automation. This process currently has several significant problems.

At present, data is transformed mostly through a series of batch processing tasks where data is collected for a certain time period and then analyzed in bulk. This creates a significant delay between the moment when new data is published and when it is factored into the data used by decision-makers. Great examples of this are US GDP reports and employment situation reports which are released so infrequently that they always shake up the stock market and may prompt over-corrective actions from the government. The frequency with which data is presented to consumers is currently being dictated by limitations of our data supply chains rather than being optimized for consumer experience.

If one party (e.g. a researcher) performs some computations on input data and shares their method and results, another unrelated party later should be able to follow their method and achieve the same results. This process is called reproducibility, and it's the foundation of the scientific method. The majority of modern data publishers, however, share data destructively—they upload new data while destroying data they shared previously, making it impossible for two independent parties to obtain the same exact input data. The lack of such guarantees completely compromises the reproducibility of most research based on open data.

Every data science project involves thousands of moving parts: from hardware and operating system it runs on, to libraries and frameworks it depends on, and dependencies of those dependencies etc. Each of these components can affect the result of a data transformation. In order to ensure reproducibility of the data projects, every single component of the execution environment needs to be recorded and versioned so that the other party could replicate it later, and all sources of non-deterministic behavior should be eliminated. This is a very time consuming process which requires a deep expertise, so it's not a surprise that such undertaking is often left out completely to meet the project timelines. As the result, modern data science is currently in a state of reproducibility crisis.

Data provenance—an ability to understand where a certain piece of data came from and which transformations it underwent—is currently a very manual and error-prone process. Even in fields like medical sciences, frequent failures to establish the provenance of data result in alarming retraction rates of publications, sometimes derailing and potentially misleading other studies. State of the art data pipelines implement provenance only on dataset level (lineage), which is too coarse grained to effectively reason about trustworthiness of data.

Overall the current state of the art does not provide people with a mechanism to collaborate on data. The lack of reproducibility results in the absence of verifiable trust between different parties and discourages the reuse of data since it's impossible to verify whether the results of transformations have not been accidentally or maliciously altered. While every respectable data project starts with data from a trusted source, it always ends up producing data the provenance of which cannot be established.

Thus, a need exists for a technology that would allow us to exchange and make improvements to data on the global scale with minimal latency, while also maintaining guarantees of reproducibility and verifiability.

BRIEF SUMMARY OF THE INVENTION

The method proposed in this invention aims to holistically address many shortcomings of modern data management systems and workflows in order to allow multiple independent parties to publish, transform, and consume data in a fast, safe, reliable, and verifiable way to let people collaborate on data on a global scale.

The disclosed embodiments of the invention do so by combining in a unique way modern technologies from fields of software engineering, temporal data modeling, streaming data processing, blockchain, and Web 3.0 technologies.

In one aspect of the embodiment, the data shared by publishers is restricted to be in the form of event records which capture the history of the datasets' subject matter. This decision is in sharp contrast to the approach prevalent among modern data publishers, which use non-temporal data that captures only the "current state" of the domain and suffers from inherent data loss problem. Instead, the presented embodiment focuses exclusively on storing temporal data in the form of historical events, so that data only grows over time and existing records are never modified. These properties serve as the foundation for reproducibility in the system. By using bitemporal data modelling techniques, the system can provide stable references to data without the need of copying and versioning the datasets—the practice that plagues modern data science.

In another aspect, every dataset in the system is treated as a potentially infinite stream of events. In contrast to modern data pipelines which primarily rely on batch processing, the system relies on modern stream processing technologies for transforming, aggregating, and enriching the data. This gives the system a significant advantage in latency, as data can propagate end-to-end within minutes. Stream processing techniques like watermarks, windowing, and triggers also significantly easier to understand and are much less error-prone to write than the equivalent batch counterparts. Therefore, they are a lot easier to audit when establishing trustworthiness of the datasets.

In another significant aspect, all information related to where the data came from, how it was transformed, and everything that ever influenced how data looks like throughout its entire lifetime is recorded in temporal metadata. Metadata is recorded as a chain of events which are cryptographically linked between themselves and with raw data. Its design was inspired by the blockchain technology and plays a crucial role in reproducibility, verifiability, and provenance. It is also an enabling factor in evolving the schema and transformations of datasets over time in a backward-compatible fashion. Its properties also allow the system to share data between parties in a much more efficient way compared to what is seen nowadays.

In another aspect, the above-mentioned properties of data immutability, guaranteed reproducibility, and temporal metadata allow bridging the field of big data management with blockchain technologies. Therefore, the presented invention enables the creation of fully distributed data processing pipelines, where every transformation step may be owned and operated by a different person or organization. This allows forming a new kind of worldwide data supply chain which can operate with no central authority, while using established blockchain consensus methods and reproducibility to ensure that data is never maliciously altered or fabricated.

BRIEF DESCRIPTION OF THE SEVERAL VIEWS OF THE DRAWINGS

For a more complete understanding of the invention, reference is made to the following description and accompanying drawings, in which:

FIG. 2 illustrates the structure and components of an individual dataset 200 which the transformation graph 101 is comprised of;

DETAILED DESCRIPTION OF THE INVENTION

Figure 1:
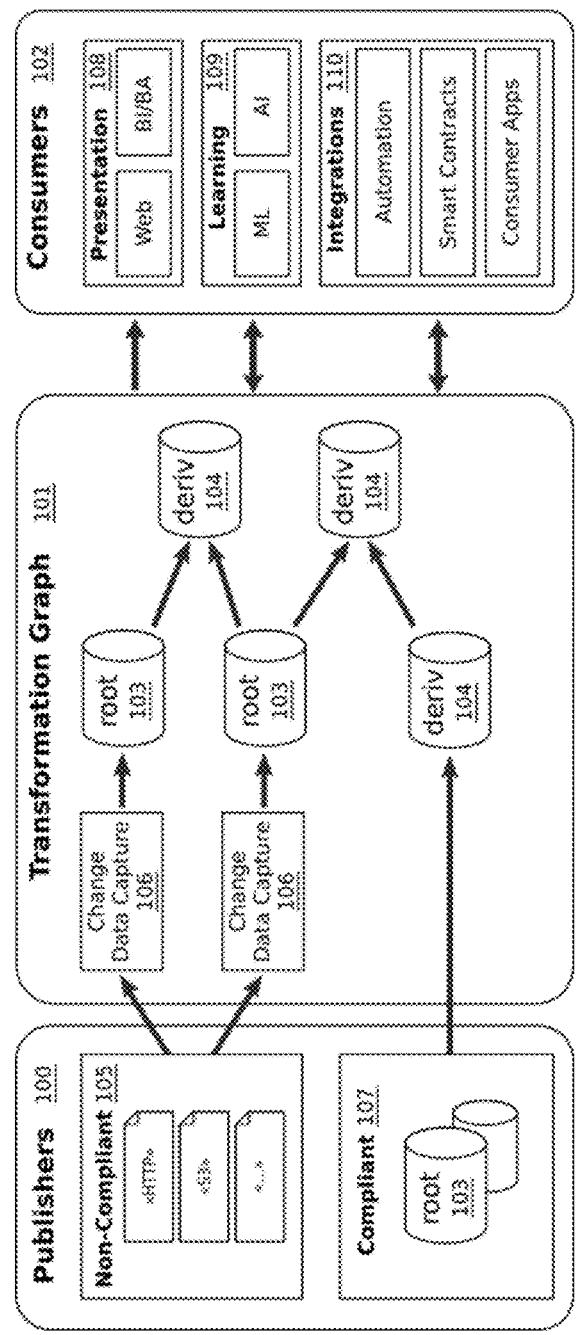
FIG. 1 illustrates an example of the system where data flows from publishers 100 to consumers 102 through the transformation graph 101 that performs data processing in accordance with aspects of the method described herein.
Figure 2:
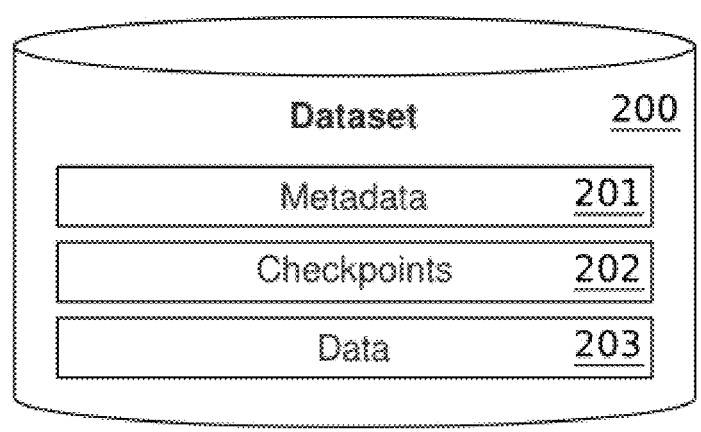

The key objectives of the presented system and method are: to address the problems of reproducibility, verifiability, and provenance in modern data science; to create an environment of verifiable trust between parties exchanging data without the need for a central authority; enable collaboration around data cleaning, enrichment, and derivation; achieve a high degree of data reuse, making quality data readily available; improve the liquidity of data by speeding up the data propagation times from publishers to consumers; provide the foundation on which a word wide data supply chain can be built. A detailed description of key design decisions is provided below, followed by the review of individual system components.

The presented system strictly differentiates between two kinds of data: source data and derivative data.

Source data, represented in the system by root datasets 103, comes directly from external systems. The organization that publishes such data 100 has complete authority over it and is fully accountable for its correctness. If lost, source data in general cannot possibly be reconstructed.

Derivative data, represented in the system by derivative datasets 104 is produced by transforming and combining other data. It is secondary to the source data but is equally important since derivative data is what's most often being used by consumers 102, presented to the decision-makers 108, used for training models 109, or fed into various automation 110. If lost, derivative data should be reconstructible by applying the same transformations to the source data.

Reproducibility in Source Data

The path towards reproducibility and verifiability has to start with the source data. The requirements can be defined as: two different parties at different time should be able to access the same exact data and validate that this data comes unaltered from the trusted source. In technical terms, it must be possible to obtain a stable reference to data which can be shared between parties and used to obtain exactly the same data at any future point in time, and data source has to provide a mechanism to ensure that data obtained this way was not maliciously or accidentally altered.

Most state of the art data publishers 105 nowadays fail to satisfy even these basic requirements. The majority of the datasets shared on the Internet come in the form of periodic "snapshots", containing the latest known state of a certain domain. These state snapshots are published destructively, by overwriting all the previously shared data. Therefore, everyone who uses the same URL to download data from these sources at different times is likely to get different data. The publishers who published data as a full history of certain events prevent the irrecoverable loss of data over time, but they still don't provide any means for obtaining a stable reference to data or any means for verifying the validity of data downloaded in the past, after new events might've been added to the dataset.

The most prevalent strategy for achieving these properties today is to copy the entire dataset from the source onto a durable storage and assign it a version or a unique identifier. This is a very poor approach for a distributed setting, when working with open data, and with fast-moving data sources. Once copied, such versioned snapshots essentially become fully independent datasets of their own since no mechanism exists that can reliably link them back to the trusted source. Such copies contribute to the overall noise, only exacerbate the problem of provenance, and should be avoided. The same issues could be said to exist in all modern attempts to create various data hubs and data portals.

The proposed method satisfies these properties by, first, restricting the form that data is represented in. Data comes exclusively in the form of historical records. History only grows; it is never deleted or altered. Thus, all data that gets into the system is immutable. The records that data is comprised of can be viewed as events (we will use this term throughout for simplicity) or relational propositions that were believed to be true at a specific time.

To support non-compliant data publishers 105 the proposed method uses Change Data Capture techniques 106, also known as "historization", to transform the state snapshot data into event form. This is done only to expand compatibility and in general not desirable. Building on the ideas of Event Sourcing and Stream-Table Duality, snapshot data is considered a byproduct of history which can always be reconstructed by projecting events onto the time axis. State data, therefore, should only be used as an optimization for queries that operate on such projections.

Secondly, the proposed method applies the Bitemporal Data Modelling techniques to event records to implement stable data references. The event schema is restricted to always contain at least two columns for time: system time, and event time. The event time column contains the time when an event occurred in the outside world, while the System Time column captures the time when the event first entered the system. System time within a dataset is guaranteed to be monotonically increasing (note that there is no such requirement for event times). Therefore, obtaining a stable reference to data is as simple as defining a closed right interval over the system time, where only events that fall into this interval will be considered while the rest will be ignored. Since events are immutable and system time increases monotonically—existing intervals will never change or see new events.

Stable references provided by the proposed method are the key enabler of reproducibility for data science workflows. Combined with an algorithm for computing cryptographic checksums for data, this technique also provides verifiability. Any party can ask the data publisher whether their checksum is correct for the specified stable reference—if it is, they can be sure that the data is valid and was not tampered with.

Reproducibility in Derivative Data

For derivative data, which is obtained purely by transforming and combining data from other datasets, reproducibility means being able to repeat all transformation steps and obtain same results as the original. Conversely, verifiability is an ability to ensure that the data presented as the result of some transformation was, in fact, produced by it without being accidentally or maliciously altered. Verifiability allows to assess the trustworthiness of data in two simple steps: ensuring that all source data comes from the reliable publishers, and auditing the transformation graph that was applied to it. Achieving this requires determinism—all transformations should be guaranteed to result in the same output given the same input—and transparency—all transformations should be known.

These requirements are simple but extremely hard to meet in modern data science. A typical project can consist of hundreds of moving parts (i.e., frameworks, libraries, operating system, hardware). Most of these components aren't purposely built with determinism in mind, so the burden of achieving reproducibility lies fully on the person who implements the project. This is by far a non-trivial problem that requires a deep understanding of the execution environment, eliminating all sources of randomness, noting the exact versions of libraries in use along with all of their transitive dependencies and so on. It's not surprising that such a significant undertaking is often left out completely to meet the project timelines. As a result, the modern data science is currently in a state of reproducibility crisis.

The proposed method suggests that data processing systems have to be built with reproducibility in mind. Until determinism becomes an intrinsic property of such systems, the method also includes a series of techniques that can help to a very high degree alleviate the burden of ensuring reproducibility of the results from the data scientists. These techniques will be presented further when looking at the transformation execution environment.

In our proposed method, the source data (considering that once recorded) is immutable, and all derivative transformations are deterministic. Therefore, derivative data of any transformation graph that follows the proposed method can be fully reconstructed by starting from the source data and re-applying all transformations. The derived data thus can be considered a form of caching. As will be shown later, this fact can significantly reduce overall data storage costs, since such data doesn't need to be stored durably or be heavily replicated.

Applying Stream Processing to Historical Data

Performing transformations on historical event data is a complex task which majority of state of the art data science techniques avoids by disregarding the time dimension and working with the state snapshots of data (projections). This is of course a gross oversimplification which cannot be applied to many problems. Consider for example the tasks of analyzing stock market data, or tracking the KPIs of the order fulfilment and shipping services—the time dimension is essential in those areas and cannot be omitted.

However, working with the temporal data brings many associated problems: data arriving late, data arriving out of order, accounting for corrections that could be issued for data that has been already processed, misalignment of data arrival cadences between datasets that are being joined, etc. It would be practically impossible on a mass scale to write a conventional batch data processing logic that correctly handles all these edge cases. Even if such logic was written correctly, its complexity would negate the benefits of verifiability—there is little benefit in being able to audit the transformation code which user can't fully understand.

One of the critical aspects of the presented invention lies in applying streaming data processing techniques to the historical event data. Modern stream processing systems like Google Data Flow Apache Spark and Apache Flink have developed a great apparatus for dealing with many of the aforementioned problems in a very intuitive way, including handling the bitemporal nature of streaming data for performing computations in the event time space rather than in the arrival time space. Conventionally, these systems are employed to build highly responsive systems that process near real-time data arriving on the network from other systems and devices. The presented method, however, benefits greatly from applying the semantics of stream processing to historical data, even data that is updated very infrequently. It uses stream processing as the primary data transformation method, treating every dataset as a potentially infinite stream of events. This can be seen as further development of the idea that batch processing is a special case of stream processing.

Using stream processing on historical data gives the presented method a significant advantage over the state of the art data management techniques as it can reduce the latency with which data propagates from publishers to consumers to minutes or even seconds. It is also advantageous from the perspective of being easier to understand, more expressive, and less error-prone to write than the equivalent batch transformations. One embodiment of the proposed method uses a streaming dialect of the SQL language for defining transformations, which can be very familiar to data scientists and engineers who are transitioning from conventional batch version of the SQL.

Temporal Metadata

In the proposed method, data 203 is never stored or transferred alone, since it would not be possible to tell where it came from and whether it can be trusted—it is always accompanied by metadata 201, which is an essential part of every dataset 200. Metadata contains every aspect of where the data came from, how it was transformed, and everything that ever influenced how data looks like throughout its entire lifetime. It is akin to a digital passport of data that is instrumental to repeatability, verifiability, and data provenance.

Another crucial aspect of the presented invention is that metadata is recorded as a series of events. This is in sharp contrast to non-temporal metadata used by contemporary data management systems.

Figure 3:
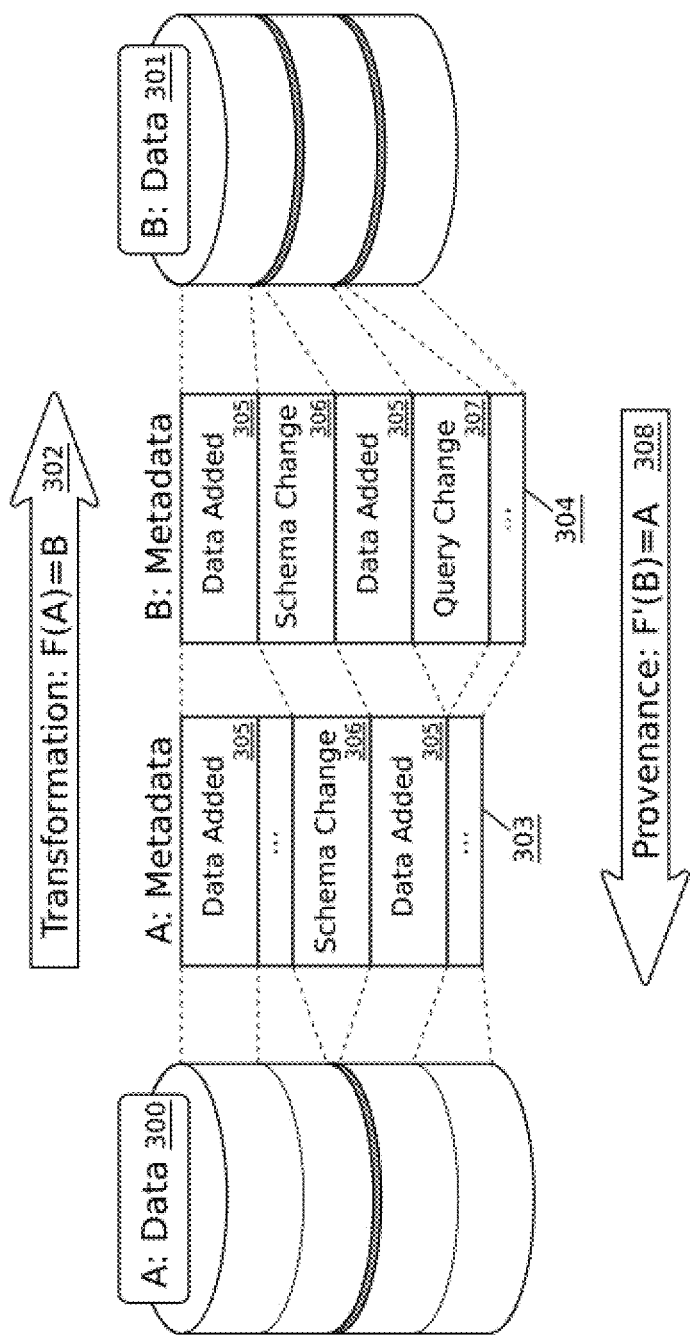
FIG. 3 illustrates how all significant events in the life-cycle of a dataset are tracked in the metadata chain, and how metadata entries of different datasets are linked together during the transformations.
Figure 4:
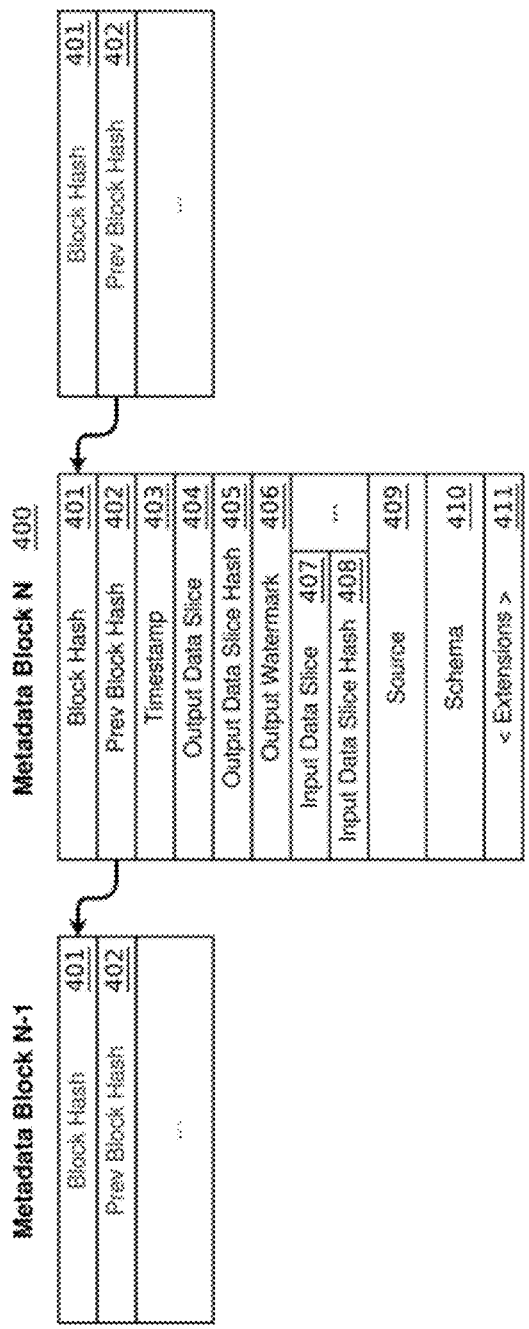
FIG. 4 illustrates an example structure of the metadata chain consisting of a series of blocks 400 that are cryptographically linked with each-other 402 and with related slices of input 408 and output 405 data.
Figure 5:
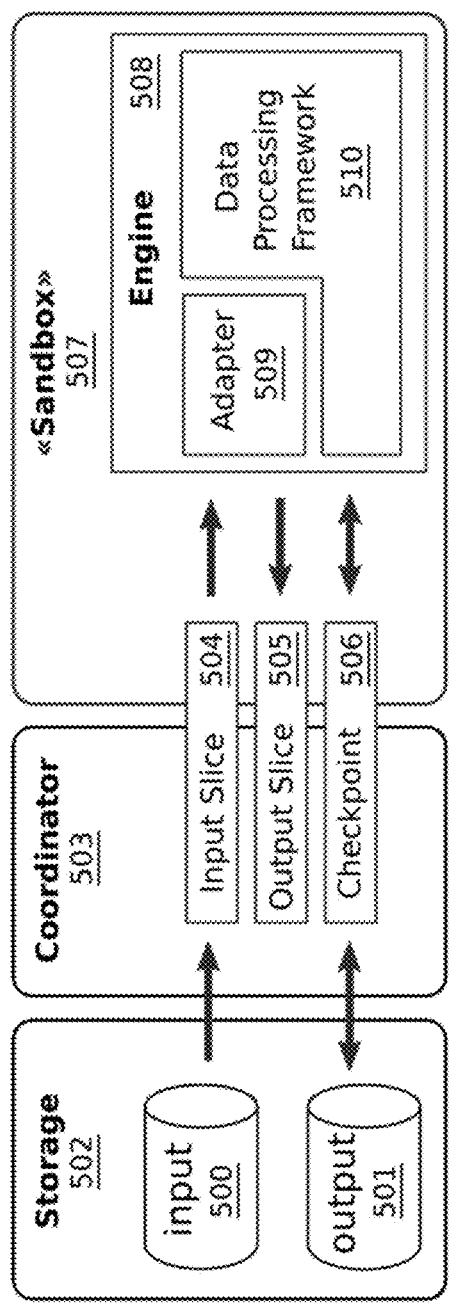
FIG. 5 illustrates an example structure of the data transformation execution environment where coordinator component 503 delegates data processing to the engine 508 which is running in an isolated "sandbox" environment 507.

For example, consider FIG. 3 depicting how metadata is managed during the data transformation. Every slice of data 300 ingested into the root dataset A has a corresponding "Data Added" record 305 in A's metadata 303. On the other hand every application of the transformation F(A)=B 302 produces new data slice 301 in derivative dataset B with its corresponding "Data Added" record in B's metadata 304. It's important to note that this record links to both new data slices in B and data slices in A that were used as inputs for the transformation. In addition to the data flow record keeping, metadata can contain special dataset life-cycle events. For example, if the publisher of A decides to add a new column—this event would be captured in metadata as "Schema Change" 306 record. Upon encountering such record, the transformation engine will know it needs to take some special actions, e.g. automatically add the new column to the query, or notify the owner of the dataset B to decide how to handle it. Similarly, if the owner of dataset B ever decides to change how transformation works—a "Query Change" record 307 will be added to metadata containing new query and the resulting schema.

Storing metadata in the temporal form has many advantages. It allows to evolve datasets over time as long as changes to metadata follow certain backwards-compatibility rules. Otherwise, the computational graph would have to be (partially) reconstructed every time the dataset schema or query needs to change. Using the complete history stored in metadata, it is possible to fully reconstruct derivative dataset by re-running all recorded transformation steps. It is also possible to validate the integrity of data by having the metadata—this brings significant advantages when sharing data in a distributed network.

The data structure used for storing metadata is inspired by blockchain technologies. It consists of multiple blocks 400 connected together in a singly-linked list. Every block is uniquely identified by its cryptographic hash 401 and contains the hash of its predecessor 402. Depending on the type of event the block describes the set of other fields can vary. In this specific embodiment of proposed method the blocks can store the system time 403, output data slice boundaries 404 and hash 405, output watermark 406, input data slice boundaries 407 and hashes 408 of all the inputs, a transformation query or a description where source data comes from 409, and a schema 410.

Metadata is also designed to be extensible and can contain additional information 411 such as semantics, ontology, governance information, license, privacy and security concerns, information that aids discovery, and interoperability data for connecting it to other systems. It, therefore, can serve as a platform for future innovations that will allow the world to collectively improve the quality of data further by standardizing and automating best data science and engineering practices.

Provenance

Being able to easily understanding how a certain piece of data came to be is crucial for building trust and confidence in reliability of data. While verifiability can tell which data sources were used to produce the overall result and which transformations were performed—it is often too coarse grained. What is needed is an ability to trace a specific piece of data back to its ultimate source, understand which events have directly contributed to its value, and what data was considered to determine its existence in the output.

The problem of provenance in modern data science is largely unsolved. Even state of the art enterprise data pipelines implement it only on a dataset level—a simplified form called lineage. Granular provenance is very hard to achieve as it needs to span through virtually every component of the data pipeline. The method presented here was designed to provide complete provenance, with many technical decisions contributing to it on multiple levels.

Temporal metadata alone outperforms the lineage information provided by the state of the art enterprise data solutions, as it gives a verifiably correct information on when and how exactly some datasets were related, and through which queries. Lineage information in existing solutions usually comes as a best-effort hint, rather than a hard fact.

Additionally, the link between individual output and input data blocks captured by temporal metadata for every iteration of a transformation can be used to significantly improve provenance granularity by limiting the search space from entire datasets to small blocks of data within them.

The dataset graph that can be reconstructed from temporal metadata also means that provenance queries work not only within directly associated datasets, but can be recursively applied until the data is traced to its ultimate source.

Finally, the declarative nature of streaming transformations allows to easily analyze the structure of queries programmatically. This means that provenance can be derived automatically for basic "map"-style queries without tracking any additional information. This can be thought of as executing some function F0(B)=A 308 that traces a data cell back to the corresponding cell in an input dataset. More complex queries such as joins and aggregations may be hard or impossible to reverse and may require provenance tracking to be supported by the underlying data processing framework. For such cases the method allows frameworks to store additional data that can aid to derive provenance alongside the resulting data in a special column. This column can then be consulted by the framework when it is queried for provenance of a certain set of records or cells. In one embodiment of this method, such information is gathered by incorporating a side channel for tracking provenance during the execution of an SQL query.

Execution of Transformations

The method presented here is designed to work with any existing stream processing framework as long as it can satisfy the requirement of determinism and provides a few extra operations for handling the events related to the dataset life-cycle, like schema and query updates. A specific implementation of such a data processing contract is called an engine 508.

To simplify the integration of new frameworks, the suggested embodiment localizes all metadata management logic in the component called coordinator 503. During the transformation, coordinator is responsible for reading the metadata of the input 500 and output 501 datasets from some storage drive 502, and determining the next command and data slice to feed to the engine. It is also responsible for maintaining the transactional semantics of all operations. Thanks to coordinator, from an engine's perspective all transformations look like conventional stream processing. Turning an existing data processing library into an engine is, therefore, a matter of creating a thin adapter 509 that conforms to the engine API contract.

The proposed method takes a few extra steps to guarantee the deterministic and reproducible properties of transformations. Engines run in a fully isolated environment called sandbox 507. Sandbox is designed to prevent engines from accessing any external resources except for the inputs and outputs of a current transformation, e.g. on the Internet or user's file system, as potential sources of undesired non-determinism. Such sandbox can be implemented using modern containerization technologies such as LXC, Docker, and Rocket.

This highlights another crucial aspect of the present invention—all transformations rely exclusively on the engine logic 508, input data slice 504, and the content of the previous checkpoint 506—they cannot access any external resources. This is very restrictive compared to many modern data processing workflows like geolocation, which often rely on the use of external APIs. Such strong restriction is imposed because external resources like APIs often evolve without following strict versioning policies and are run by companies that can disappear over night—it is impossible to achieve reproducible results in such environment. Running any "black box" operations like API calls would require to re-classify derivative datasets that use them as roots and admit that such data is non-reproducible. Instead, the method suggests that the software algorithms and ML models used by such transformations are incorporated into the system itself as the engine extensions or pure data.

To further strengthen the reproducibility guarantees of the proposed system, every transformation is associated with an exact version of the engine that performed it. This excludes the possibility of any code changes in the engine producing different results than what was originally observed.

Some computations over the input data like windowed aggregations or temporal joins may require the engine to maintain some state. Engine is required to fully consume input data during transformation, so some of this state may need to be preserved in between the invocations of a query. For this purpose, engines are allowed to maintain checkpoints—a piece of opaque and fully engine-specific data used to store intermediate state. Along with data and metadata, checkpoints are an integral part of a dataset. If checkpoint is lost, the entire computation will have to be restarted from scratch.

Data Sharing

The proposed method is distributed in its nature and designed with data sharing efficiency in mind. The previously covered aspects directly contribute towards this goal.

The source data is irreducible by definition. The method makes no assumptions that this data can be retrieved from anywhere else in case its lost. Thus, every peer that publishes source data is responsible for storing it durably, in a replicated and highly-available way.

In the proposed method, the derivative data is considered transient. Therefore, all parties that publish derivative datasets can use the cheapest data hosting available (or no hosting at all) without the need for durability or heavy replication.

The immutability property of both data and metadata ensures they can be easily and safely replicated without complex synchronization mechanisms. Metadata being cryptographically linked to the raw data means that there is no need to encrypt the data itself or use a secure channel for distributing it unless there is a specific need for data to remain private. It is usually sufficient to securely distribute the metadata and use it to establish the authenticity of the downloaded data. Metadata is several orders of magnitude smaller than associated data, so it can be easily hosted and widely shared.

With all these properties combined, the proposed method achieves near-perfect results when it comes to data storage and distribution costs. By also eliminating the data duplication that presently happens for purposes of reproducibility, this solution is vastly superior to all existing methods of data sharing when it comes to space efficiency.

Particular Implementations

One possible embodiment of the proposed method is described further.

To represent structured data, one implementation may utilize two data formats differentiated by their purpose. An in-memory format is used when passing data around between the subsystems (e.g. when Coordinator 503 communicates with the Engine 508). For this purpose it may be beneficial to use Apache Arrow format as it's designed for minimal overhead interoperability between data processing systems, minimizes copying of data, is hardware efficient, and supports streaming. An on-disk format is used for data at rest and by query engines when performing analytical queries on the datasets. For this purpose it may be beneficial to use Apache Parquet format, as it is fast to decode into Apache Arrow, space and IO efficient thanks to the built-in compression, efficient for querying thanks to the columnar structure and built-in basic indexing.

When storing data on disk, it may be written into multiple "part" files, corresponding to the metatata blocks that produced them. Once part file is written it is immutable for the entire lifetime of the dataset, with the exception of the possible compacting operation that would combine multiple smaller part files into a larger one for efficiency.

A schema format is necessary to describe the shape of data by associating names and data types to columns that data is composed of. The proposed embodiment uses an SQL-like DDL syntax for defining data schemas, as it operates with logical types, abstracting the physical data layout from the user, is widely familiar, and has high interoperability with modern data processing systems.

An example DDL schema describing the columns and types of a dataset:
    system_time TIMESTAMP(3),
    registration_time TIMESTAMP(3),
    registration_id UUID,
    email STRING,
    first_name STRING,
    last_name STRING,
    date_of_birth DATE, As previously mentioned, an implementation will need to require all dataset schemas to have the following columns. The system_time column denotes when an event first appeared in the dataset. This will correspond to an ingestion time for events in root datasets or to transformation time for event in derivative datasets. The event_time column denotes when to our best knowledge an event has occurred in the real world. This time is used for most time-based windowed computations, aggregations, and joins.

To store the metadata, it is recommended that the implementation uses a format that provides fast read performance, complex type support (particularly nested structures and unions), allows for forward and backward compatibility, allows for a controlled way of making breaking changes, and has a stable and well-defined in-memory representation in order to create stable hashes for metadata block identification and integrity. One possible option is to use FlatBuffers format for internal metadata representation. FlatBuffers format is very beneficial for read performance as data doesn't need to be decoded or deserialized at all before it can be used by the application. This can allow the implementation to potentially support millions of metadata blocks per dataset.

To exclude the possibility of tampering, the implementation can use a secure and reliable cryptographic hash function for signing and validating metadata blocks. One good choice would be a modern SHA3-256 algorithm, which would be used on the memory block produced by FlatBuffers when encoding a metadata block.

To support non-compliant data publishers some embodiments may choose to implement "pull"-based data ingestion where the coordinator periodically fetches the externally-hosted data and ingests it into the system. Such embodiments will need to account for the wide variety of formats used by data publishers and to use the appropriate strategy for "historization" of the newly-fetched data, converting it into event form if needed.

Example definition of a pull-style root dataset using the YAML format:

```
apiVersion: 1
kind: DatasetSnapshot
content:
id: ca.vancouver.opendata.property.tax-report
source:
    kind: root
    fetch:
       kind: url
       url: https://opendata.vancouver.ca . . .
    read:
       kind: csv
       header: true
       nullValue:"
    merge:
       kind: ledger
       primaryKey:
          PID
    vocab:
       eventTimeColumn: TAX_ASSESSMENT_YEAR
```

While the proposed embodiment is agnostic in regards to technologies used to implement data transformations and languages used to declare them, it is worth mentioning a few recommendations. In particular, frameworks like Apache Spark (its SQL, and Structured Streaming subsystem) and Apache Flink may be good candidates—they are both powerful and mature stream processing systems and let users write queries using streaming dialects of the SQL language, which is very expressive, easy to use, and understand.

Example of a derivative dataset that performs a temporal-table join (projection join) to produce a stream of the current market value of all positions in a stock portfolio using the Apache Flink streaming SQL dialect:

```
apiVersion: 1
kind: DatasetSnapshot
content:
id: com.example.trading.holdings.market-value
source:
    kind: derivative
    inputs:
       com.yahoo.finance.tickers.daily
       com.example.trading.holdings
    transform:
       kind: sql
       engine: flink
       temporalTables:
          id: com.example.trading.holdings
       primaryKey:
          symbol
       query: >
          SELECT
             tickers.event_time,
             holdings.symbol,
             holdings.cum_quantity,
             holdings.quantity,
             tickers.close_adj*holdings.cum_quantity   as
                market_value
          FROM
             'com.yahoo.finance.tickers.daily' as tickers,
             LATERAL TABLE (
             'com.example.trading.holdings'(tickers.
             event_time)) as holdings
          WHERE tickers.symbol=holdings.symbol
```

The execution of a transformation requires close cooperation between the coordinator and an engine. The proposed implementation breaks the whole process down into the following series of steps:

Batch step—coordinator analyzes the metadata chains of the dataset being transformed and all of the inputs. The goal here is to decide how far the processing can progress before hitting one of the special conditions, such as a change of schema in one of the inputs or a change of the transformation query;

Run migrations (if needed)—if a special condition is encountered, the coordinator calls engine's "migrate query" operation to make necessary adjustments for the new transformation parameters;

Run query—coordinator passes the input data slices into the engine's "execute query" operation;

Hash data—coordinator obtains a stable hash of the output data slice;

Prepare commit—coordinator creates the next metadata block;

Commit—it atomically adds the new data slice and the metadata block to the dataset.

Besides running streaming transformation, an engine has to support several operations related to life-cycle management of a dataset. The recommended set of operations includes:

Validate query—validates the user-specified query for basic syntax and schema correctness;

Execute query—performs the next iteration of the transformation;

Migrate query—updates the transformation state from one query to another;

Derive provenance—explains the origin of some data produced in the past.

For better interoperability, it is recommended to implement such operations in a special adapter component 509 that would mediate communications between the coordinator 503 and the framework 510. The implementation may choose to use gRPC as the communications protocol between the adapter and coordinator.

Special care has to be taken when implementing all operations in order to guarantee the transactional semantics.

Each operation should either fully succeed or fail while leaving the dataset in a consistent state.

When implementing the sandboxed execution environment 507 for the engines 508, a good candidate technology is Docker as it's currently the most popular containerization tool, it supports most major operating systems, and its accompanying Docker Hub provides a convenient way to reliably distribute the engine images.

When referencing an engine image, it is recommended to use the full cryptographic digest of an image rather than relying on its Docker name and tag because it excludes the possibility that someone will maliciously overwrite an existing tag by re-uploading an image into the registry.

To achieve best performance, it is very important to establish an efficient way for coordinator 503 to be able to pass data back and forth to the engine 508. This method ideally should avoid any serialization or copying of data on the way in and out. The present embodiment achieves this by decoding data into Apache Arrow format once and then passing the memory buffer into the engine using the memory-mapped file (mmap).

When datasets are exchanged between participants of the presented distributed system, the proposed embodiment does not impose any restrictions on which protocols and technologies are used to transfer and store data. Data can be stored on any file-based or object-based storage system like Amazon S3, Google Cloud Storage, HDFS, and others. It is also possible to make use of Web 3.0 technologies like DAT and IPFS to store data in a distributed network spread amongst many computers in the world, to further underline the data democratization features of the proposed method.

An embodiment of the proposed method may also utilize the fact that the metadata format is very similar to blockchain technologies by its design and can easily integrate with existing blockchain protocols such as Ethereum.

Existing attempts of integrating blockchain technologies with big data suffer from the same aforementioned problem of stable references. Since most datasets are too big to be stored directly on the blockchain itself—the ledger blocks need to somehow reference the data stored elsewhere. Currently, as was already shown, this is only possible through copying and versioning. The proposed method is, therefore, vastly superior when it comes to blockchain integrations since it provides reliable stable references, and the temporal metadata blocks are small enough to be placed onto the ledger directly.

Combining the proposed data supply chain with blockchain is a very powerful concept as it allows to build measures for cross-validating data produced by peers, and identifying and preventing malicious activity within such chain early. This also presents an opportunity for data in such a system to be used by Smart Contracts protocols as a replacement for existing Data Oracles, which at present are centralized and don't fit well with the otherwise fully distributed nature of the blockchain.

What is claimed:

1. A computer implemented method comprising:
    a. receiving source data, by a processor, as macro or micro batches, or a continuous stream of records;
    b. transforming source data by a processor into the form of a bitemporal event ledger where every record contains a time when event happened in an external system, and a time when event was received by a processor;
    c. storing the data, by a processor on a non-transitory computer readable storage medium, in a series of blocks to create an immutable append-only ledger of events;
    d. computing, by a processor, a cryptographic hash sum of the records in every data block, and storing the hash sum alongside any other information associated with the newly-added data in a metadata block;
    e. creating a cryptographic link between the new metadata block and a previous metadata block by a processor, and storing the new metadata block on a non-transitory computer readable storage medium to create a tamper-proof metadata ledger to verify integrity of data and captures history of how data was changing over time;
    f. creating, by a processor, derivative datasets as a sequence of stream processing operations applied to one or many source or derivative datasets;
    g. restricting stream processing operations to a deterministic and reproducible subset that cannot interact with any external systems;
    h. storing, by a processor on a non-transitory computer readable storage medium, source code of stream processing operations in the metadata ledger of a derivative dataset associated with a specific version of a data processor that executes said code;
    i. executing the stream processing operations by a specific version of a data processor stored in the metadata ledger;
    j. storing, by a processor on a non-transitory computer readable storage medium, in the metadata ledger, ranges of input data processed in one iteration of the stream processing operation along with the cryptographic hash of the data produced as an output to capture the reproducible and verifiable history of transformations.

2. The method of claim 1 further comprised of storing pre-aggregated ledger data at a non-transitory computer readable storage medium.

3. The method of claim 1, further comprised of a mechanism for encrypting sensitive datasets by a processor to keep data and metadata private to a narrow group of peers.

4. The method of claim 1, wherein the source data and derivative transformations are additionally owned by different parties, forming a distributed system.

5. The method of claim 4, wherein some participants of the distributed system provide computational resources to other parties for manipulating data remotely.

6. The method of claim 4, wherein a participant of the distributed system provides to other participants value-added services consisting of data hosting, ingesting data regularly, executing derivative transformations, and verifying transformations performed by other peers.

7. The method of claim 4, wherein metadata is further integrated into a blockchain system.

8. The method of claim 7, wherein data is used as an input for smart contracts in a blockchain system.

9. The method of claim 7, wherein a subset of blockchain nodes independently performs transformations declared in the metadata in order to detect and mitigate any malicious behavior.

* * * * *